United States Patent Office 3,445,243

Patented May 20, 1969

1

3,445,243

DESSERT GEL AND COMPOSITION THEREFOR

Arthur L. Moirano, Mountainside, N.J., assignor to Marine Colloids, Inc., Springfield, N.J., a corporation of Delaware No Drawing. Filed May 16, 1966, Ser. No. 550,150
Int. Cl. A23l 1/04, 1/06
U.S. Cl. 99—131 16 Claims

ABSTRACT OF THE DISCLOSURE

An aqueous gel system for providing a dessert gel utilizing locust bean gum in combination with conventional potassium-sensitive carrageenan is improved so as to overcome difficulty due to excessive syneresis during storage by the addition of a type of calcium sensitive carrageenan.

This invention relates to aqueous gels and more especially relates to edible gels of the dessert gel type and to compositions which are soluble in water to produce such gels.

Dessert gels prepared from locust bean gum, a potassium-sensitive carrageenan such as extracted from *Chondrus crispus* (Irish moss) and a potassium salt for supplying potassium cations that impart increased gelling properties to the carrageenan have long been known and are disclosed in the Baker Patent 2,466,146. Such dessert gels are prepared by dissolving a small amount of the locust bean gum and potassium-sensitive carrageenan in hot water in the presence of potassium cations and then cooling with concomitant gelation. Any additive appropriate for making the dessert gel more appetizing may be included. Such additives usually are in the form of soluble substances which impart sweetening, flavor and color. Dessert gels of this type have the advantage of being economical to prepare and possess excellent eating qualities since they do not have the stickiness and sliminess often associated with other gum gelling systems. Notwithstanding these advantages, commercial production of dessert gels of this type has been precluded because of lack of clarity of the finished gel and because of the excessive syneresis of the finished gel.

The lack of clarity of the finished gel results primarily from the fact that locust bean gum as commercially marketed contains impurities which result in the formation of hazy solutions, while attempts to clarify locust bean gum solutions by ordinary expedients have resulted in a product having basic instabilities. A method for the preparation of stabilized locust beam gum adapted to form clear solutions is now disclosed in copending application Ser. No. 496,177 filed Oct. 14, 1965, now U.S. Pat. No. 3,346,556.

The problem of excessive syneresis of the finished gel when prepared from locust bean gum and potassium-sensitive carrageenan in the presence of potassium cations has been a serious one which precludes use in the preparation of finished gels which are packed in cans or jars and which must have a prolonged shelf life. Moreover, the problem of excessive syneresis makes it impractical to prepare gels from dried solid compositions whenever the finished gel, after its preparation, must stand for a substantial period of time as, for example, in the case of dessert gels prepared for institutional or restaurant consumption.

It is a principal object of this invention to provide a dessert gel of the type employing locust bean gum and a potassium-sensitive carrageenan in the presence of potassium cations which retains its excellent eating qualities and which greatly inhibits or substantially completely eliminates the problem of excessive syneresis.

2

When locust bean gum is employed in combination with a potassium-sensitive carrageenan such as that extracted from *Chondrus crispus* in the presence of potassium cations, there appears to be a synergistic effect between the locust bean gum and the potassium-sensitive carrageenan as has been disclosed in the aforesaid Patent No. 2,466,146. The locust bean gum by itself tends to form viscous solutions rather than a gel. Carrageenan such as that extracted from *Chondus crispus*, on the other hand, exhibits gel-forming properties which are greatly enhanced by the presence of potassium cations in solution, but the resulting gel is not satisfactory for dessert gel purposes due to its shortness and brittleness which detract excessively from its consumer acceptance. However, the combination of such carrageenan with locust bean gum when dissolved in water to form a gel in the presence of potassium cations exhibits an extremely desirable dessert gel consistency, but subject, however, to the disadvantages mentioned hereinabove.

The potassium-sensitivity of carrageenan extracted from *Chondrus crispus* is due to the presence in the carrageenan of a substantial amount of kappa carrageenan. Many carrageenans are made up of two principal fractions, namely, kappa carrageenan and lambda carrageenan. It is the kappa carrageenan which exhibits gel-forming properties that are enhanced by the presence of potassium cations. While the kappa carrageenan and the lambda carrageenan can be separated, it is not necessary to do so and in the practice of the invention that which ordinarily is employed is a carrageenan that contains a substantial proportion of kappa carrageenan. That recovered from *Chondrus crispus* is of this type. Another carrageenan which is relatively high in the kappa fraction and which is preferred for use in the practice of this invention is that which is recovered from the sea plant *Eucheuma cottonii*.

The potassium-sensitivity of potassium-sensitive carrageenan is exhibited whenever it is dissolved in water in the presence of potassium cations. For purposes of definition herein and in the claims, the term "potassium-sensitive carrageenan" has reference to a carrageenan which, when dissolved so as to provide a 1.5% solution of the carrageenan in water containing an amount of potassium chloride in the range from 0.1% to 0.2% by weight, exhibits substantially greater gel responsiveness to the presence of potassium as compared to calcium cations supplied by a like concentration of calcium chloride. Other sea plants from which carrageenan of the kappa type having potassium-sensitivity is obtainable are *Gigartina stellata, Gigartina pistillata, Gigartina canaliculata, Gigartina chamissoi, Eucheuma edule* and *Eucheuma okamura.*

This invention is predicated on the discovery that the syneresis incident to a gel based on locust bean gum and a potassium-sensitive carrageenan can be greatly inhibited and even completely eliminated by the additional employment in the dessert gel of a carrageenan that is calcium-sensitive, namely a carrageenan extract which when disposed in an aqueous solution of 1.5% concentration exhibits substantially greater gel responsiveness to calcium than to potassium in the presence of calcium chloride and potassium chloride, respectively, in an amount that is in the range from 0.1% to 0.2%. Calcium-sensitive carrageenan preferably is obtained as an extractive from the sea plants *Eucheuma spinosum* and Agardhiella. Other examples of seaweeds from which calcium-sensitive carrageenan may be extracted are *Eucheuma serra, Eucheuma isiforme, Eucheuma muricatum* and *Eucheuma uncinatum.* The calcium-hensitive carrageenans also are different from potassium-sensitive carrageenan in that they do not exercise a synergistic effect in combination with locust bean gum analogous to that incident to the use of the potassium-sensitive carrageenans. Moreover, in the absence of locust bean gum the gelling effect which is induced by the presence of calcium cations is that of providing an extremely elastic gel in sharp contrast to the short and brittle gels which are produced when a carrageenan of the potassium-sensitive type is dissolved in water in the presence of potassium cations. However, the calcium-sensitive extracts are compatible with a system based on locust bean gum and carrageenan of the potassium-sensitive type to form gels of a highly desirable eating consistency and when so used in accordance with this invention the resulting gel exhibits little or no syneresis.

In order to provide the desired synergism with the locust bean gum, at least half of the gel-forming ingredients of the dessert gel should consist of the locust bean gum and the potassium-sensitive carrageenan. The amount of the calcium-sensitive carrageenan may range from an amount which is effective to substantially inhibit syneresis to an amount not greater than the sum of the weights of the locust bean gum and potassium-sensitive carrageenan. If a greater proportion of the calcium-sensitive carrageenan is employed, the dessert gel becomes deteriorated as regards its gelling consistency. Ordinarily the amount of the calcium-sensitive carrageenan varies from about 20% to about 100% of the sum of the weights of the locust bean gum and the potassium-sensitive carrageenan. In order to provide the desired synergism between the locust bean gum and the potassium-sensitive carrageenan, the weight ratio of these gums should range from about 1:5 to about 5:1.

The potassium-sensitive carrageenan used in the practice of this invention may be that which is extracted by conventional procedures from the sea plant containing it using hot water or mildly alkaline solution followed by reduction of the extracted carrageenan to solid form by removal of water or by coagulation by adding the carrageenan-containing solution to a water miscible non-solvent for the carrageenan such as isopropyl alcohol or butanol or acetone. Ordinarily, however, it is preferable to employ a potassium-sensitive carrageenan which has acquired enhanced potassium-sensitivity as the result of extraction in the presence of lime as described in Patent 3,094,517. Such carrageenan is referred to hereinbelow as high gel strength potassium-sensitive carrageenan, as distinguished from potassium-sensitive carrageenan whose gel strength potential has not been enhanced in the manner referred to.

Whether potassium-sensitive carrageenan is used which is of low gel strength or is of high gel strength, the presence of potassium cations is essential to the development of gel strength when in water solution. A substantial amount of potassium may be present in the potassium-sensitive carrageenan as the result of the method of producing the carrageenan whereby some of the carrageenan occurs in the potassium salt form, i.e., potassium carrageenate. In such case when the carrageenan is dissolved in water the carrageenan itself provides a sufficient quantity of potassium cations to cause moderate gelation. However, greater gel strength is provided by the addition to the carrageenan of a non-toxic water-soluble salt of potassium other than potassium carrageenate such as potassium citrate which is preferred because of its buffering action in the finished gel. However, other potassium salts may be used such as potassium chloride, potassium phosphate, potassium sulfate, potassium tartrate. Some commercially supplied carrageenan extracts contain potassium salt in addition to any potassium carrageenate comprised therein and when additional salt is desired its inclusion in the finished dessert gel may be provided in this way. Of course, additional potassium salt as desired may be added at the time the finished dessert gel is being made up. More generally, there should be employed with the potassium-sensitive carrageenan potassium in an ionizable form which may be the potassium of potassium carrageenate or potassium supplied by the addition of a potassium salt other than potassium carrageenate, or both. Ordinarily it is preferable that at least some potassium be present in the form of a soluble non-toxic salt other than potassium carrageenate so as to take full advantage of the gelling potential of the potassium-sensitive carrageenan.

With reference to the calcium-sensitive carrageenan, the presence of calcium cations in sufficient quantity to induce substantial gelation is not essential from the standpoint of affording a satisfactory gel consistency in which substantial syneresis is prevented. In the absence of calcium cations the gelling properties provided by the mixture of locust bean gum and potassium-sensitive carrageenan are sufficient to develop a desirable gel consistency and syneresis is effectively inhibited by the presence of the calcium-sensitive carrageenan. However, it ordinarily is preferable to employ a calcium-sensitive carrageenan under circumstances such that the gelling potential of the calcium-sensitive carrageenan is developed by the presence of calcium cations. In ordinary practice the gelling potential is sufficient when the calcium cations are supplied by calcium carrageenate which is comprised in the calcium-sensitive carrageenan as extracted from the sea plant in the presence of lime. However, a non-toxic soluble calcium salt other than calcium carrageenate may be present. In view of the low concentration of calcium cations which need to be present, a substance such as calcium sulfate or calcium citrate possesses sufficient solubility at the pH of the water dessert gel system to provide calcium cations in ionized form for promoting the gelation of the calcium-sensitive carrageenan. Other non-toxic calcium salts may be employed such as calcium chloride, calcium lactate, calcium gluconate, calcium oxide, calcium phosphate.

The dessert gel of this invention lends itself to the packaging of the essential ingredients thereof in dry, solid, particulate form for commercial sale and this invention is to be understood as being applicable to the packaged ingredients as well as the finished gel. All that is required to prepare the finished gel is to heat the water in which the solid composition is to be dissolved to promote the solution of the components. Especially in the case of locust bean gum it is essential in order to obtain complete dissolution, as distinguished from mere swelling, that the water be heated to a temperature approaching the boiling point. After dissolution has been effected, gelation to desired gel consistency occurs upon cooling to room temperature. For most dessert gel applications the total weight of locust bean gum, potassium-sensitive carrageenan and calcium-sensitive carrageenan will be about 2.0 to about 8.0 grams per pint of water depending on whether the potassium-sensitive carrageenan is of the low gel strength type or is of the high gel strength type and also upon personal taste as regards the strength that is desired in the finished gel.

The following are illustrative examples of the formulations in parts by weight of the gel-forming constituents for making a dessert gel in accordance with this invention:

Formulation A:

| | Parts |
|---|---|
| Potassium-sensitive carrageenan (high gel strength type) | 0.5 |
| Locust bean gum | 1.5 |
| Calcium-sensitive carrageenan | 1.0 |

Formulation B:

| | |
|---|---|
| Potassium-sensitive carrageenan (low gel strength type) | 2.0 |
| Locust bean gum | 1.5 |
| Calcium-sensitive carrageenan | 1.0 |

The consistency of the finished gel will be acceptable for average consumer taste when Formulation A is used at the rate of about 3 grams per pint of water and Formulation B is used at the rate of about 4.5 grams per pint of water. Increased gel strength may be provided by supplementing Formulations A and B with 1 part of potassium citrate to promote the gelation of the potassium-sensitive carrageenan. If desired, a small amount of calcium sulfate also may be employed to promote the gelation of the calcium-sensitive carrageenan.

In the finished dessert gel it is customary, of course, to provide substances which provide sweetening, flavor and color. Sugar is the most common sweetening agent, although for dietetic desserts a lower calorie sweetening agent may be employed. The following is illustrative of a typical dessert gel composition of this invention:

| | G. |
|---|---|
| Formulation A | 3.0 |
| Sugar | 77.0 |
| Adipic acid | 2.5 |
| Potassium citrate | 1.0 |
| Calcium sulfate | 0.3 |

In the foregoing composition 4.5 grams of Formulation B may replace the 3 grams of Formulation A.

Instead of adipic acid for imparting tartness, other non-toxic flavorful acids may be employed such as citric, fumaric and tartaric. Other or alternative flavoring substances may be employed as well as coloring agents. The presence of a buffer salt is desirable and potassium citrate serves this purpose. If the potassium cations are furnished by a potassium salt other than potassium citrate, then some other buffer salt may be employed such as sodium citrate.

The formulations of this invention likewise may be added to natural fruit juices which already contain sufficient acid to impart tartness and to which sugar or some other sweetening agent may be added as desired.

While the compositions of this invention may be sold when packaged in dry particulate form for use by the purchaser in making a syneresis-resistant dessert gel, this invention makes possible the storage of finished gels with a minimum of syneresis over long periods of shelf life even under the adverse conditions of high temperature commonly encountered in the commercial distribution of such products.

What is claimed is:

1. A solid particulate composition soluble in water to form a gel in the presence of potassium cations which comprises:

(a) a mixture of locust bean gum and potassium-sensitive carrageenan in the weight ratio range from about 1:5 to about 5:1, and (b) a calcium-sensitive carrageenan in an amount that is effective to substantially inhibit syneresis and that is not greater than the sum of the weight of said locust bean gum and said potassium-sensitive carrageenan.

2. A composition according to claim 1 wherein said calcium-sensitive carrageenan constitutes from about 20% to about 100% by weight of the sum of the weights of said locust bean gum and said potassium-sensitive carrageenan.

3. A composition according to claim 1 wherein said calcium-sensitive carrageenan is an extract from a sea plant selected from the group consisting of *Eucheuma spinosum,* Agardhiella, *Eucheuma serra, Eucheuma isiforme, Eucheuma muricatum* and *Eucheuma uncinatum.*

4. A composition according to claim 1 wherein said potassium-sensitive carrageenan is an extract from a sea plant selected from the group consisting of *Chondrus crispus, Eucheuma cottonii, Gigartina stellata, Gigartina pistillata, Gigartina canaliculata, Gigartina chamissoi, Eucheuma edule,* and *Eucheuma okamura.*

5. A composition according to claim 1 wherein said composition comprises water-soluble flavoring and sweetening substances.

6. A composition according to claim 1 which includes a non-toxic salt of potassium soluble in water to provide potassium ions effective to promote the gelation of said potassium-sensitive carrageenan.

7. A composition according to claim 6 wherein said salt of potassium comprises a substantial amount of a potassium salt other than potassium carrageenate.

8. A composition according to claim 6 which includes a non-toxic salt of calcium soluble in water to provide calcium cations effective to promote the gelation of said calcium-sensitive carrageenan.

9. A syneresis-resistant aqueous gel comprising water containing potassium cations and having dissolved therein in effective amount to produce a gel in the presence of said potassium cations (a) a mixture of locust bean gum and potassium-sensitive carrageenan in the weight ratio range from about 1:5 to about 5:1, and (b) calcium-sensitive carrageenan in an amount that is effective to substantially inhibit syneresis and that is not substantially greater than the sum of the weights of said locust bean gum and said potassium-sensitive carrageenan.

10. An aqueous gel according to claim 9 wherein said calcium-sensitive carrageenan constitutes from about 20% to about 100% by weight of the sum of the weights of said locust bean gum and said potassium-sensitive carrageenan.

11. An aqueous gel according to claim 10 wherein said calcium-sensitive carrageenan is an extract from a sea plant selected from the group consisting of *Eucheuma spinosum,* Agardhiella, *Eucheuma serra, Eucheuma isiforme, Eucheuma muricatum* and *Eucheuma uncinatum.*

12. An aqueous gel according to claim 11 wherein said potassium-sensitive carrageenan is an extract from a sea plant selected from the group consisting of *Chondrus crispus, Eucheuma cottonii, Gigartina stellata, Gigartina pistillata, Gigartina canaliculata, Gigartina chamissoi, Eucheuma edule,* and *Eucheuma okamura.*

13. An aqueous gel according to claim 10 which contains dissolved edible flavoring and sweetening substances.

14. An aqueous gel according to claim 10 wherein the combined weight of (a) plus (b) is about 2.0 to about 8.0 grams per pint of water.

15. An aqueous gel according to claim 10 which contains dissolved therein a substantial quantity of a non-toxic potassium salt other than potassium carrageenate which provides potassium cations effective to enhance the gelation of said potassium-sensitive carrageenan.

16. An aqueous gel according to claim 10 which comprises dissolved therein a substantial quantity of a non-toxic calcium salt which provides calcium cations effective to enhance the gelation of said calcium-sensitive carrageenan.

References Cited

UNITED STATES PATENTS

| | | | |
|---|---|---|---|
| 2,466,146 | 4/1949 | Baker | 99—131 |
| 3,342,612 | 9/1967 | Foster et al. | 99—131 |
| 3,367,783 | 2/1968 | Billerbeck | 99—131 |

RAYMOND N. JONES, *Primary Examiner.*

J. M. HUNTER, *Assistant Examiner.*

U.S. Cl. X.R.

99—139